United States Patent

[11] 3,609,227

[72] Inventor Maynard J. Kuljian
Palo Alto, Calif.

[21] Appl. No. 758,559
[22] Filed Sept. 9, 1968
[45] Patented Sept. 28, 1971
[73] Assignee Ampex Corporation
Redwood City, Calif.

[54] RANDOM ACCESS AUDIO/VIDEO INFORMATION RETRIEVAL SYSTEM
19 Claims, 5 Drawing Figs.

[52] U.S. Cl. ........ 178/6.6 A, 35/35 C, 179/100.2 MD
[51] Int. Cl. ........ H04n 1/28, G09b 5/06, G11b 5/86
[50] Field of Search ........ 35/35 C, 60; 178/6.6 A; 179/100.2 MD, 100.2 E

[56] References Cited

UNITED STATES PATENTS

| | | | |
|---|---|---|---|
| 3,199,226 | 8/1965 | Joslow | 35/35 |
| 3,200,516 | 8/1965 | Parker | 35/35 |
| 3,269,033 | 8/1966 | Redfield et al. | 35/35 |
| 3,426,339 | 2/1969 | Rich et al. | 35/35 |
| 3,485,946 | 12/1969 | Jackson et al. | 178/6.6 |

*Primary Examiner*—Bernard Konick
*Assistant Examiner*—J. Russell Goudeau
*Attorney*—Robert G. Clay

ABSTRACT: A random access retrieval system particularly adaptable as an instructional resource center, wherein master recording mediums feed audio or audio/video information recorded thereon in the form of selected programs to individual recording mediums, at the request of an individual located at one of a plurality of information request positions. The programs are selected on a time-sharing basis utilizing control logic generally in the form of computer/controller means which integrates all system operations, e.g., commands the operation of all recording mediums and operates the audio/video switching systems. The time-sharing concept allows program requests to be made simultaneously and not be held for more than 30 seconds, with the total waiting time for transfer of a program not exceeding 60 seconds in the particular retrieval system described herein by way of example only. To this end, programs are recorded on the master recording mediums at a selected slow speed, but are transferred to the individual recording mediums at a selected relatively fast speed, to provide the essentially instant information retrieval. The individual recording mediums may have an extra track for the responses or comments of the requestor. Various embodiments and modifications are available in accordance with the invention concepts.

PATENTED SEP 28 1971 3,609,227

SHEET 1 OF 4

INVENTOR.
MAYNARD J. KULJIAN

BY Robert S. Clay

ATTORNEY

INVENTOR.
MAYNARD J. KULJIAN
BY Robert S. Clay
ATTORNEY

INVENTOR.
MAYNARD J. KULJIAN
BY
Robert H. Clay
ATTORNEY

INVENTOR.
MAYNARD J. KULJIAN

BY Robert G. Clay

ATTORNEY

RANDOM ACCESS AUDIO/VIDEO INFORMATION RETRIEVAL SYSTEM

BACKGROUND OF THE INVENTION

1. Field of the Invention

The present invention relates generally to information retrieval systems and more particularly to a random access information retrieval system complex, which provides wide flexibility and practically instant retrieval of video and/or audio information at stations either within or remote from the system complex.

2. Description of the Prior Art

The information explosion prevalent in our present society is demanding the development of additional methods and devices with which to assist the essentially human task of teaching and learning. That is, there is more significant information available to school libraries than can be effectively utilized in instruction through existing procedures. The physical problems alone are prohibitive and thus new methods of storage and use are being perfected. To this end, various teaching devices have been developed which range from extremely simple, paper-moving devices for use at student desks, to complex and expensive computer retrieval systems for selectively supplying programmed material to a large number of students, instructors, or classrooms.

However, present prior art systems, including the more expensive systems, all lack random access to the stored information, i.e., to the programmed material subject to retrieval by the individual requestors. Further, present retrieval systems now in operation are all handicapped by the basic lack of flexibility in design, and thus in their capability to perform additional functions, such as telephone compatibility, self-testing for malfunctioning, logging of program use, audio and video information compatibility, etc. This deficiency is further apparent in that present retrieval systems must employ scheduled programming, or provide the disadvantage that any one program is taken out of circulation by a request for the program from just one individual. Thus students who subsequently request a program which has been previously selected by a first student, obtain access to the program at that point in the program's process, or must wait until the first student is finished with the tape. In large schools such scheduling is not practical since obviously a correspondingly large number of individuals may wish to simultaneously use the same or a variety of available programs. Accordingly, it is essential for a retrieval system to have complete flexibility of selection, and particularly, instant retrieval of a large number of programs.

SUMMARY OF THE INVENTION

The present invention provides a random access information retrieval system which is particularly adaptable as a self-operated student instructional center having a combination of features heretofore unavailable in a single student information retrieval system.

In the basic invention embodiment, program material in the form of audio or audio/video information is recorded on a plurality of endless master tape loops which are coupled to a plurality of individual student tapes or buffer means via random access audio switch means. Overall control of the system is performed through a small, general purpose, digital computer/controller wherein all requests or communication between the student, an instructor and/or the tapes, passes in and out of the computer/controller. Commands from the students and/or the instructor are generated by a touch keyboard of the type employing solid-state circuitry with no moving parts. Each program stored on the master tape loops has its own identifying number, and a particular program is selected for transfer by touching a respective combination of keys which correspond to the program number. Transfer of the program is accomplished at relatively high speed in a manner generally known per se in the art, and is thus actually a duplicative rather than a recording process. Thereafter, the same touch keyboard is used by the student to control the operation of his respective tape, whereby he may listen and respond to the program material as well as compare his responses with the program material as often as desired.

Thus the invention includes individual student control of transferred information during both playback and recording, while allowing him to select programs which always start at the beginning. By way of example, in this particular apparatus, a maximum waiting time of less than 60 seconds for any given number of users allows practically instant retrieval of the programs.

The invention thus provides small integrated control/display units which can be remotely located in classrooms and other buildings, and also provides telephone interconnections to permit outside calling and access to the stored programs via a telephone. The system further provides for random access, high-speed transfer of information from the master tape loops to an individual student cassette placed within a "dubber" located remotely, whereby the student may subsequently play back the information using his own cassette-type tape recorder. The "dubber" includes a touch keyboard similar to the keyboards employed with the student buffer means.

DESCRIPTION OF THE PREFERRED EMBODIMENTS

Although the present invention is described hereinafter with relation to an educational resource center for students and to specific numbers of tape loops, programs, consoles, disc devices, tape speeds, etc., it is to be understood that the invention retrieval system may be used in any field wherever audio and/or video preprogrammed instruction is desired, and further that many variations are possible in the number and arrangement of the various components forming the system, within the spirit of the invention.

The basic system elements include master memory bank means for storage of audio or audio/video programs, a random access audio switching system, a plurality of individual student buffers, computer/controller means, information request means including individual student positions or carrels, and a supervisor's control console having a teletype unit. The system may also include dedicated video source means and/or a telephone access system wherein the latter system may be considered as part of the information request means of previous mention. In another embodiment, an individual student buffer and a carrel may be replaced by a "dubber" whereby information may be transferred to a student's cartridge for him to take with him. A further embodiment includes video processing apparatus for handling the video portion of the audio/video information for retrieval along with the audio portion.

A plurality of master programs, of, for example, 15 minutes of length each, are contained on a plurality of master memory units within the master memory bank, and a student record/readout device defining in essence a buffer system is associated with each student carrel. As described hereinafter in various embodiments, the system is capable of providing random access to audio information and/or audio/video information at relatively high speeds.

In the figures the various blocks are coupled via lines which are descriptive of the type of signals which flow through that particular line, e.g., commands, information or status signals. Thus, a single solid line indicates command and status signals flow, a double solid line indicates random access audio information flow, a single dashed line indicates dedicated video flow, and a double dashed line indicates random access video information flow.

Figure 1:
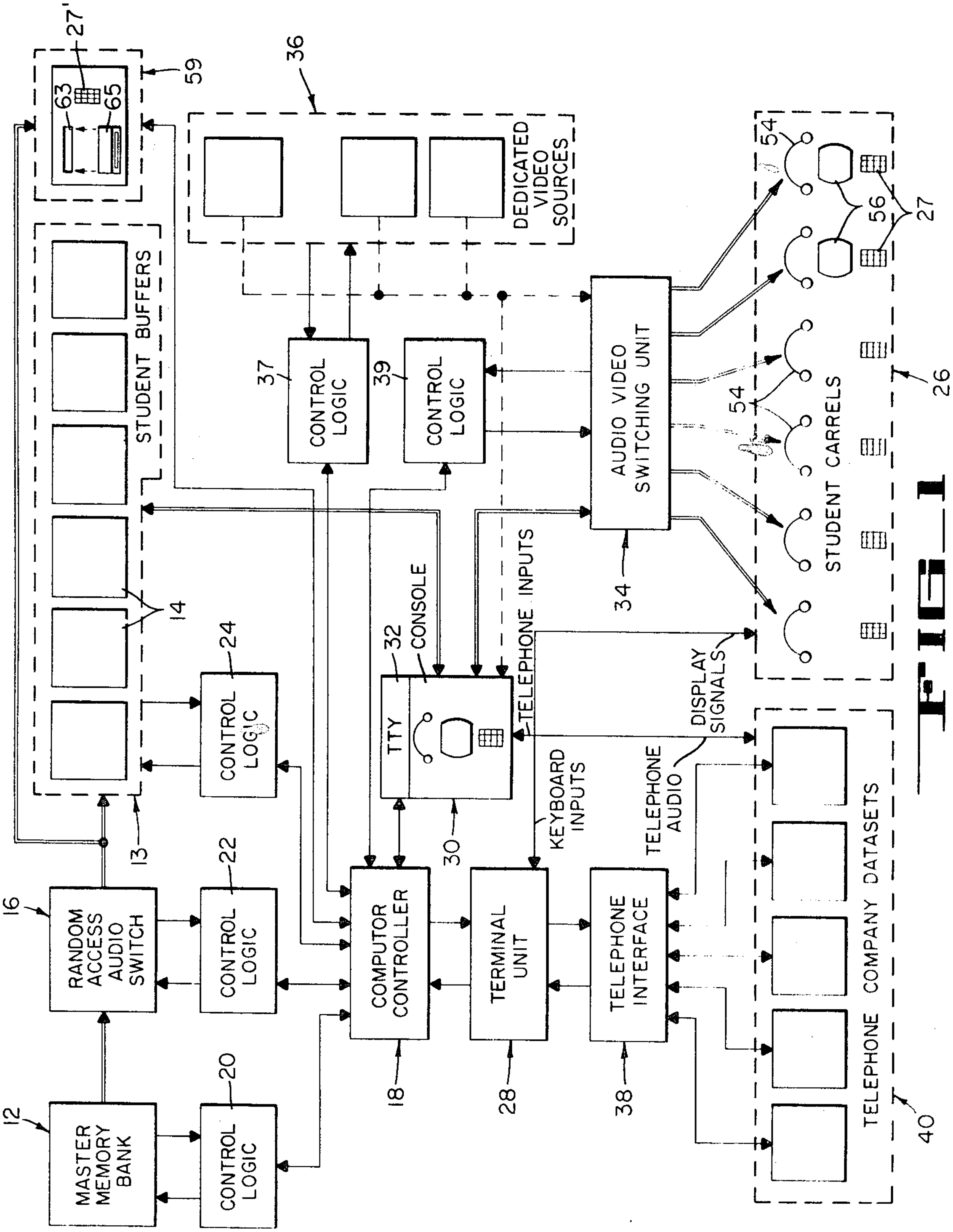
FIG. 1 is a block diagram of the random access audio retrieval system of the invention.

Referring to FIG. 1, a master memory bank 12 is coupled to student record/readout means 13, which defines a plurality of individual student buffers 14, via a random access audio switch 16, whereby audio information is selectively transferred from the master memory bank 12 to the student buffers 14. Computer/controller means 18 is coupled via control logic means 20, 22 and 24 to the master memory bank 12, random access audio switch 16, and student buffers 14, respectively, and provides control of the transfer of information, as well as additional functions further described hereinafter. A plurality of student carrels 26, including individual touch keyboards 27, are coupled to the computer/controller means 18 via the terminal unit 28. Thus, requests for a particular program are initiated as commands from the student via the keyboard 27 and are introduced to the computer/controller means 18 via the terminal unit 28, not only to effect the transfer of information but also the subsequent operation of the individual student buffers 14 utilizing the same keyboard 27 and keys.

An instructor console 30 including teletype means 32 is coupled to the computer/controller means 18, and audio information flow is provided via the console 30 between an audio/video switching unit 34 and the plurality of student buffers 14. Audio information being utilized by the students may be monitored by the instructor at the instructor console 30, as indicated by the double solid lines.

By way of example only, dedicated video source means 36 is coupled to the audio/video switching unit 34 to provide a limited degree of dedicated video information along with the audio information from the student buffers 14. Control logic means 37 and 39 are provided between the computer controller means 18, and the dedicated video source means 36 and audio/video switching unit 34 respectively. It is to be understood that the dedicated video source and thus the audio/video switching unit 34 and logic means 37, 39 may be omitted from the system, whereby accordingly, each student buffer 14 is connected (via a respective solid double line) to its respective student carrel 26.

If desired, a telephone interface 38 is provided coupled between the terminal unit 28 and any plurality of conventional telephone company datasets such as A. T. and T. X403A datasets herein indicated at 40, whereby access to information in the master memory bank 12 is provided to students at a point remote from the system complex, e.g., in the student's home.

The master memory bank 12 of previous mention is formed preferably of a plurality of endless tape loops, record/readout devices herein defined as individual master memory units (not shown). The memory bank 12 may be formed of a plurality of Ampex Corporation recorders of the fixed bin type, for example, Model FB–700, but obviously may employ reel-to-reel, drum, disc, etc., type recorders. In the embodiment described herein, by way of example only, each tape loop has 32 tracks thereon, where each track has a separate playback head. Each individual master memory unit within the master memory bank 12 thus holds 32 15-minute programs which are disposed in side-by-side relation along the length of the tape loop. Each of the 32 playback heads feed one of 32 electronic channels, wherein any or all programs on the master memory units are capable of being simultaneously transferred to requesting students. The electronics are wideband units which accommodate the high frequencies produced by the 40-to-1 speed-up duplicating process used in the program transfer, further described infra. The reproduce amplifiers used in the electronics have sufficient drive to permit simultaneous transfer of a program to all the student buffers 14. A specialized driver circuit is employed in each of the electronic channels, wherein the output is a floating, balanced, 4 ohm line. The balanced line is preferred in order to cancel noise and crosstalk between the channels; the low impedance of the driver circuit permits all the student buffers 14 to bridge the line at once without overloading or degrading the electronics. The individual master memory units in the master memory bank 12 always operate at a relatively high transfer speed which, in this specific embodiment, by way of example only, is equal to 120 inches per second. Use of this high speed permits a 15-minute program to be transferred from the master memory bank 12 to the student buffers 14 in less than 30 seconds. Transfer speeds may approach 1,000 inches per second, when high-speed tape transports, high-frequency heads and driver circuits are utilized. Program material for each of the master memory units is conventionally recorded on a separate master maker either at a relatively slow speed of for example 3 inches per second or at any higher speed desired. Off-line generation and editing of programs is done with facility on this master memory unit.

The random access audio switch 16 of previous mention may comprise a full matrix audio switching unit, which provides interconnection between one or any number of programs on any of the master memory units, and any or all of the student buffers 14. The preferred audio switch 16 configuration is formed of binary relay "trees." The large end, e.g., the branches of the "tree," is coupled to all programs in the master memory bank 12. The small end, or trunk, of the "-tree" is coupled to the individual student buffer; therefore, one "tree" circuit is required for each student position, or carrel 26. The "tree" circuit concept offers the advantage of intrinsic decoding of the computer address. The audio switch 16 is completely under the control of the computer/controller means 18 in response to requests from the student carrels 26, telephone company datasets 40 and/or the instructor console 30. The audio switch 16 also may be formed of a trunkline type of system of the type utilized by telephone companies, rather than a full matrix audio switching unit as described. Such switching systems may utilize the well-known " party line" concept, whereby a plurality of student buffers 14 are selectively coupled to a single switch output line in time-sharing relation in a manner well known in the art.

The student buffers 14 of previous mention may be record/readout devices which are mechanically identical to the individual master memory units, with the exception that ½-inch tape is used in place of the 1-inch master memory tape loops. A single track in each student buffer is used to record the high bandwidth information being transferred from the master memory bank 12. During the transfer the student buffer 14 runs at the same relatively high speed as the master memory units, e.g., 120 inches per second in this exemplary apparatus. The student buffer 14 also includes a 3-inch-per-second speed for normal playback and recording by the student, upon transfer of the desired program to his buffer. When operating at this speed, the student may both listen to the program and record his own voice on a second track on the buffer tape. The student buffer has the following operating modes; high-speed record, play program, record student, play student, play both, standby, and recue. All of these modes, except for the high-speed record mode, are controls which the student has at his fingertips on his individual touch keyboard, further described below. After the initial request for a particular program by a student, the high-speed record function is controlled solely by the computer/controller means 18 during the transfer of information from the master memory bank 12 and thus the transfer is "studentproof."

Figures 2, 3:
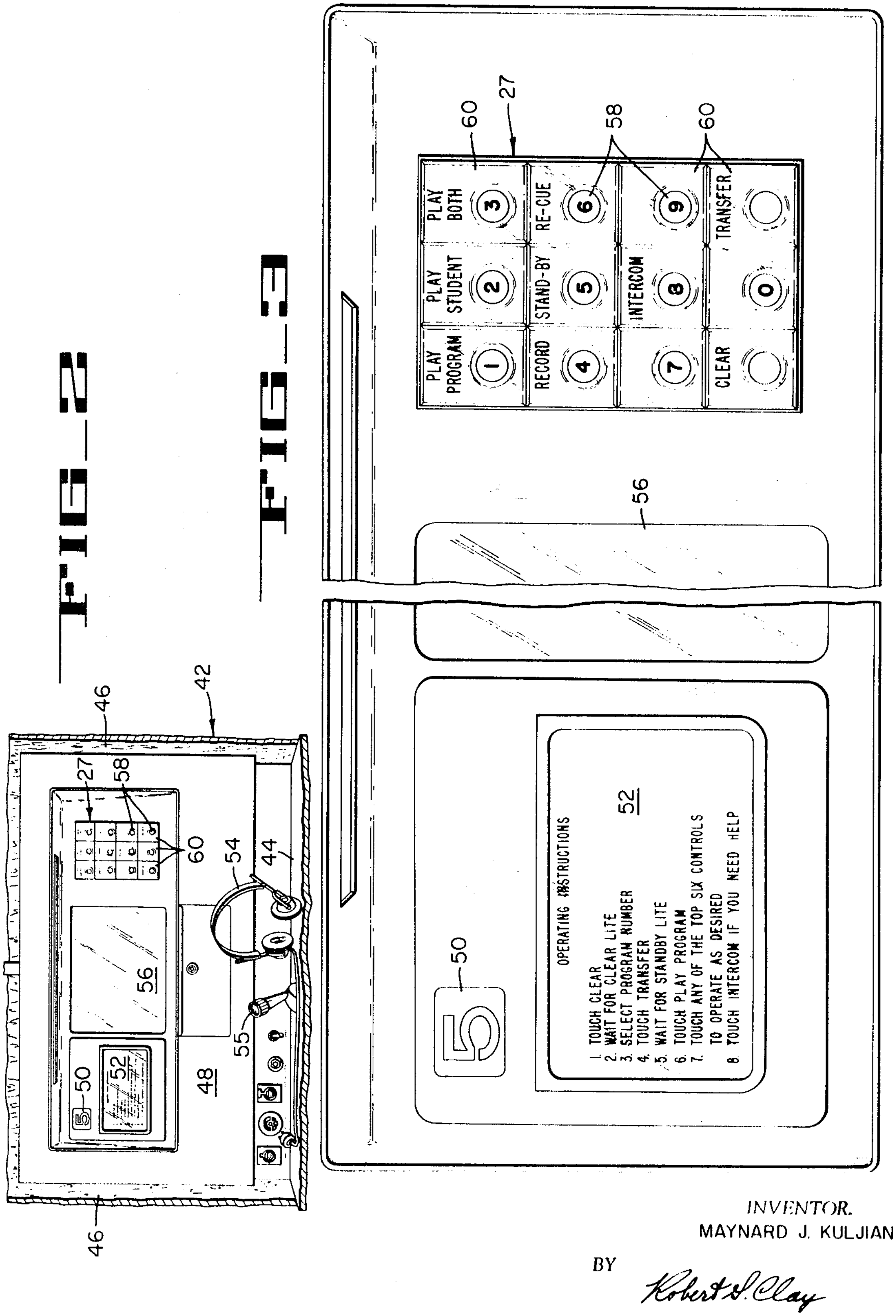
FIG. 2 is a partial elevation view of the student carrel as seen by the student.
FIG. 3 is an enlarged, partial view of the operating instructions, the video screen and the keyboard of the carrel shown in FIG. 2.

The student carrels 26 of previous mention provide various functions in addition to providing the means for listening to information transferred to the student buffers 14. Thus the carrels 26 provide means for recording and listening to the students' own comments via their respective microphones and headsets. As shown in FIGS. 2 and 3, the carrels 26 are provided with individual positions or stalls 42 in the form of a desk area 44 enclosed at the back end and sides thereof by walls 46, wherein each stall or carrel is provided with a suitable chair. Each carrel 26, and thus student, is provided with a touch keyboard 27, preferably recessed within a student control panel 48, with which program numbers are selected and which allows the student to control his individual buffer 14 and to call the supervisor for assistance. The student control panel 48 also includes a carrel-identifying number (indicated by numeral 50), a list of operating instructions 52, a headset 54, a microphone 55 and various plugs, lights, etc. The panel may also include a video screen 56 for display of either the dedicated video information obtained from source 36 of FIG. 1, or the random access video information provided by the system of FIGS. 4 or 5, as described infra. In the audio retrieval system of FIG. 1, two such video screens 56 are shown by way of example wherein any number of the carrels 26 may, or may not, include such video screens. In the audio/video system of FIGS. 4 and 5, all carrels have a video screen as shown.

Regarding particularly FIG. 3, one layout for the keyboard 27 is shown in greater detail. The keyboard includes 12 nonmoving touch keys 58, numbered 1–9 and zero, whereby the three-digit program numbers of the master memory bank 12 may be requested as further described infra. The keys 58 are each integrally recessed within a respective translucent material block 60. A light is provided behind each translucent block 60 which serves as an "indicator light," wherein the array of blocks 60 serves as a display of the status of the system operation. Each block 60 is labeled to indicate either the function of the enclosed key 58 and/or the status of the system operation.

Before transfer of information to the student buffer 14, the numbered keys 58 are employed to select the program desired. After transfer is accomplished, the same keyboard 27 serves as a control board, with each block 60 or key 58 being labeled with its function or status indication.

Thus the touch keyboard 27 forms a lighted, studentproof, display and control board which indicates the existing status information concerning the retrieval system operation by lighting various ones of the plurality of blocks 60. The touch keyboard 27 is specifically designed with no moving parts and contains only a small amount of solid state circuitry. The keyboard is preferably of the type described in the copending U.S. application Ser. No. 467,494 filed June 28, 1965, now issued as U.S. Pat. No. 3,437,795, and assigned to the same assignee as this application. Since the keyboard 27 communicates directly with the computer/controller means 18 on a time-sharing basis, the student has no direct connection with his buffer 14 or any other part of the invention system, which is thus protected from abuse, intentional or otherwise. All student and classroom positions, i.e., all student carrels 26 or telephone datasets 40, may enter keyboard requests simultaneously since switching is accomplished to any or all buffers 14 via the computer/controller 18 and the random access audio switch 16.

The supervisor console means 32 of previous mention (FIG. 1) comprises a monitor/intercom system with a headset, keyboard and intercom apparatus (not shown) which provides a highly sophisticated form of supervisory control for the invention system. Audio information for each student passes through the console 30 and may be monitored without the student's knowledge. A complete intercom facility is provided so that the supervisor may cut off the program and may converse with the students directly at their respective carrels. The student can call the supervisor to his line by touching a single key of his keyboard 27, which causes the computer/controller means 18 to log out the requesting position number at the teletype means 32 and ring the teletype bell to obtain the instructor's attention. An auxiliary keyboard/display unit (not shown) on the supervisor console 30 allows the supervisor to take over control of any student buffer 14, share control with the student, or completely disable a given position. The teletype means 32 located on the console 30 also logs out each requested program number, including the number (e.g., numeral 50 of FIG. 3) of the position or carrel from which the request originated. This feature may be expanded to provide means for logging out a student's number as well as his position, if desired.

The overall control of the invention retrieval system is performed through a small, general purpose, digital computer herein defined as the computer/controller means 18; which by way of example only, may be a SEL–810A computer manufactured by Systems Engineering Laboratories. All control and status information passes in and out of this particular component, which operates in conventional manner in conjunction with a preselected program. Student requests enter the computer/controller means 18 and initiate the automatic sequence of events in accordance with the given computer program, to cause the audio switch 16 to select the desired program, the appropriate individual master memory unit to start operation, the high-speed transfer to take place, the change of tape speed to occur when the transfer is finished, the switching of the same keyboard 27 from a program request mode to a buffer control mode, the sensing of the status of all system components, and the transmission of appropriate status signals to the translucent blocks 60 of the same keyboard 27 of each individual student control panel 48.

Should a student press the intercom key on this keyboard 27 (e.g., No. 8, FIG. 3), the computer causes printout on the teletype means 32 of the number of the requesting position. Also, the teletype bell of the teletype means 32 rings to obtain the supervisor's attention. In this manner, all calls for help form the students to the supervisor are typed in sequence by the teletype means 32, assuring priority for the caller. As noted above, each requested program number also is recorded on the teletype 32 with the position number requesting it. The computer/controller 18 provides the facility to disable selected student positions for any reason whatever. Keys on the computer/controller means panel (not shown) may be thrown to disable the intercom function, disable the racks of student buffers 14 undergoing repair, etc., so that work may be done on selected parts of the system without interrupting major system operation.

Computer diagnostics are provided to check the system daily before turn-on. Should a malfunction occur, such as a broken tape, the unit be identified by diagnostic procedures controlled by the computer/controller means 18. In operation, the high speed of the means 18 permits it to accommodate simultaneous program requests by a large number of students without saturating the system. The computer/controller means 18 also provides a great advantage in altering the character of the overall system. For example, the present system can be used for automated testing and scoring of students merely by adding appropriate software to the computer/controller means program.

The control logic means 20, 22, 24, 37 and 39 are conventional in design and function as interfaces between the computer/controller 18 and the respective circuits which are to be controlled. The control logic means comprise thus the usual combination of registers, gates, decoding logic circuits, power drivers for operating relays, etc.

The present invention is further designed to accept inputs from a plurality of telephone lines. Thus, the telephone interface 38 provides means for introducing the requests for programs from a plurality of telephone company datasets 40 by merely dialing the telephone. The interface 38 (which may actually be a part of the terminal unit 28) provides the logic necessary to condition the dataset signals into a form which is compatible to the computer/controller 18; that is, to signals identical in form to those delivered by the keyboards 27. Thus the datasets 40 have the conventional two sets of four wires, wherein the output consists of signals in the form of a "two-out-of-eight wire code." The telephone interface 38 as well as the keyboards 27 provide an output signal in a "binary coded decimal" form, also generally known in the art by this definition. The terminal unit 28 further provides the logic necessary to condition the keyboard (and modified dataset) signals for use by the computer/controller 18, and also accepts the status signals from the computer/controller and causes these to be displayed on the keyboard 27 as lighted blocks 60.

The telephone facility provides the capability for a plurality of simultaneous telephone callers to receive the same programs that students in the school can obtain. Thus the students may receive lesson material at home. Furthermore, nearby satellite schools may avail themselves of this central storehouse of master programs by utilizing the telephone facility. The only equipment required at the remote end of the facility is the standard touchtone telephone. In the case where the information is being dialed by telephone to a large class or auditorium, the telephone may be coupled with a speaker amplifier to thereby introduce the information to the entire room. Accordingly, a teacher having a touchtone telephone can bring to a class in less than 30 seconds, any lesson material or supplementary enrichment material relevant to the subject being learned by that class. This feature also permits the use of the system as a vast library of audio information accessible anywhere by telephone, and thus the system of the invention may be used in the medical, industrial, military, etc., fields as well as the educational field.

As shown in FIG. 1, the system is readily adapted to provide a dedicated form of video, as well as audio, information via the dedicated video source means 36. The source means 36 may be a device or devices such as video-tape recorders (e.g., Ampex VR-660), home slide projectors, live television cameras, television receivers, etc., which are coupled via the audio/video switching unit 34 to the student carrels 26 in synchronism with the audio information being supplied thereto. The synchronism is provided by the computer/controller means 18 which simultaneously switches both the audio and the video information to the student carrels via the associated control logic means in response to the student's particular request.

In operation, the system of the invention starts with system initialization. When the system is turned on, a simple operation of a few computer switches (not shown) automatically brings all tape units in the master memory bank 12 and the student buffers 14, and the random access audio switch 16, to a ready status. When all units have been tested and confirmed ready, a teletype printout in the teletype means 32 notes the ready status. All student positions in the student carrels 26 are then automatically enabled. Now a student may request a program represented by a three-digit number, by touching the corresponding keys 58 of his keyboard 27. For example, if he wishes program number 139 he touches keys numbered 1, 3 and 9, and then the "transfer" key. The computer/controller means 18 then initiates automatic connection and transfer of the desired program from the master memory bank 12, through the random access audio switch 16, to the selected student tape of the student buffers 14. The student keyboard which until this time is utilized to dial the particular program desired is then deactivated with regard to the memory bank 12, and is activated for use as a control board, whereby the student may control his individual student buffer 14 using the same keys. The student thus has 6 control functions, previously mentioned above and designated on the keyboard 27 of FIG. 3, which may be exercised at his own pace without disturbing other system users and without tying up the master memory bank 12. As previously noted, if the student desires help from the supervisor, he merely touches the designated intercom key on his keyboard, which activates a printout and bell on the teletype means 32. The supervisor may then enter the student's audio line and converse with the student. If desired, the supervisor may take over control of the student's buffer or may share control with the student.

In another embodiment of the invention system, means is provided either for use in conjunction with, or as a replacement for, the student buffers 14 and carrels 26, which means provides for the transfer of the programs from the master memory bank 12 to a cartridge or cassette which belongs to the requestor. The means includes a "dubber" 59 depicted in FIG. 1 by way of example, as a part of the student record/readout means 13.

The dubber 59 is an information requesting and recording device which may be situated near the carrels 26, in classrooms, hallways, or in other locations remote from the other components of the system. The dubber 59 is provided with a slot 63 which is adapted to receive a cartridge or cassette 65 of designated or standardized design capable of recording information thereon. A touch keyboard 27' similar to the keyboards 27 hereinbefore described in FIGS. 1–3, is also provided as part of the dubber 59. A switching circuit (not shown) in the dubber activates the keyboard 27' when a cassette is placed in recording position within the slot 63. The keyboard 27' is coupled to the computer/controller 18 whereby touching the keys of the keyboard initiates the commands subsequently generated by the computer/controller which determine the transfer of information from the master memory bank 12, through the random access audio switch 16, to the cassette 65 in the dubber 59. Thus the dubber is an information-requesting/recording station, any number of which may be placed at various locations, whereby a requestor may insert his own personal cassette into the dubber, and may record thereon any program material which is stored in the master memory bank 12. He may then take the cassette with the program material thereon, to his home, study room, lecture room, etc., where the cassette is placed in a conventional cartridge or cassette-type tape recorder whereby the tape may be played back as desired. The same advantages provided by the invention system exist when using one or more dubbers in the system; that is, the system provides random access retrieval; programs may be requested by one or more requestors with a maximum wait in this particular apparatus of less than 60 seconds, including the 30 seconds for information transfer to the cassette; the information is transferred at the high duplicating speed of for example 120 inches per second; the system is studentproof, etc.

The dubber 59 is thus formed of the keyboard 27' corresponding to the keyboard 27 of the student carrels 26, a cassette recording medium corresponding to the record portion of the student buffer 14, a cassette-type tape transport system and his own personal cassette-type tape recorder/reproducer which corresponds to the reproduce portion of the student buffer 14. Although the components forming the dubber 59 are rearranged relative to the corresponding components of the buffer-14/carrel-26 apparatus, their individual as well as overall functions in the system are essentially the same. It is to be noted, that if a random access information retrieval system utilizing only a plurality of dubbers 59 is desired, the student carrels 26, the telephone datasets 40, telephone interface 38, instructor's console 30, dedicated video source 36, and all the associated control logic means, etc., may be omitted from the system of the invention. Further, since the computer/controller 18 function is fixed, i.e., only a single, selected "program" of control logic is required, the computer/controller 18 may be replaced by a more simplified "computer/controller" defined by a hard-wired control logic circuit (not shown) capable of providing the control required to switch programs selected via the touch keyboard 27' from the bank 12 to the dubber 59. Further, it is understood that video as well as audio information may be introduced to the dubbers 59 utilizing video/audio recording systems for the dubber apparatus, and utilizing the random access video handling systems of FIGS. 4 and/or 5.

Figure 4:
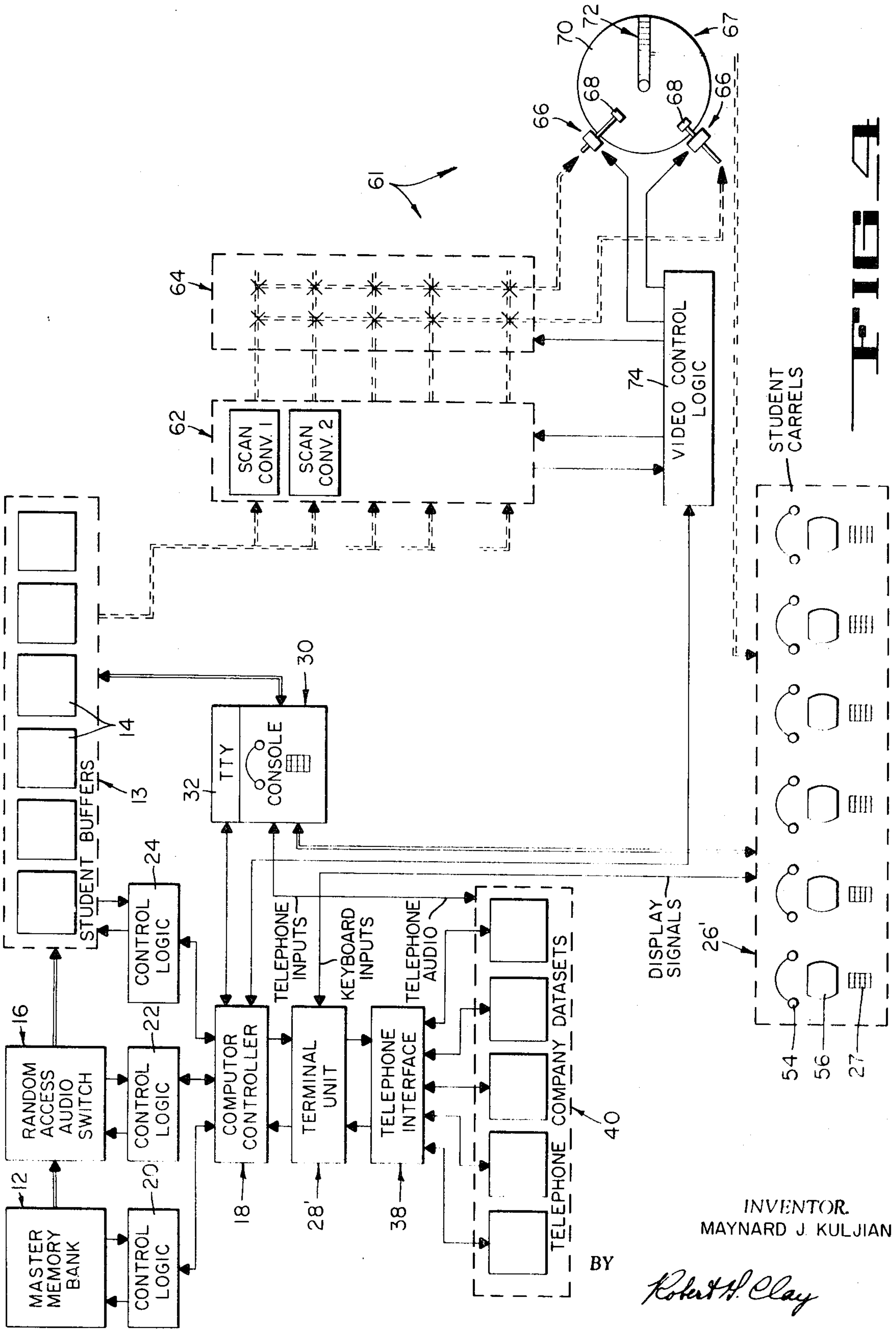
FIGS. 4 and 5 are block diagrams of alternative embodiments of audio/video retrieval systems of the invention.
Figure 5:
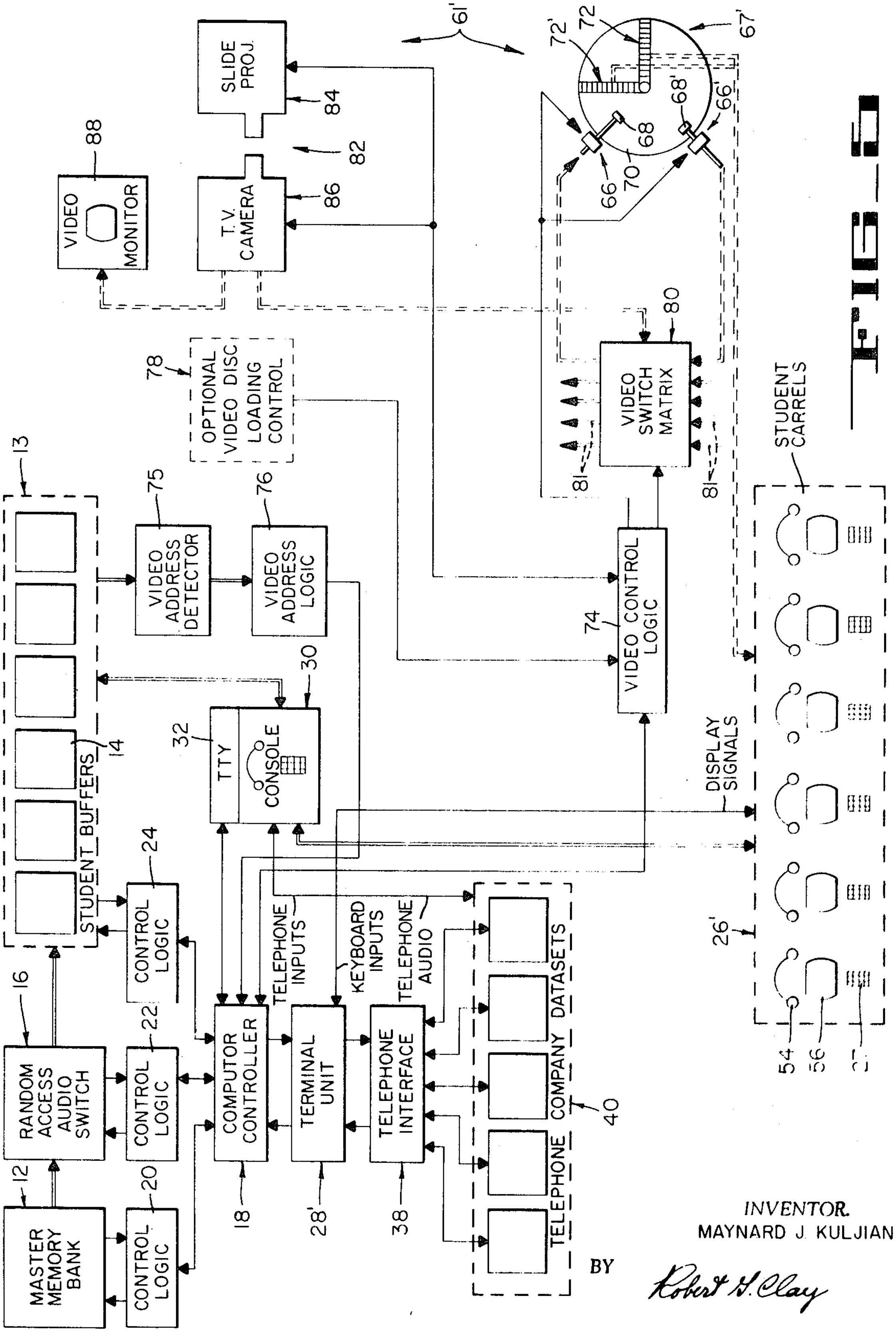

Referring now to FIGS. 4 and 5, there are shown alternative embodiments of the invention comprising random access retrieval systems capable of handling both audio and video information. As may be seen, the systems are essentially the same as that shown in FIG. 1, but include in addition various components which allow the retrieval of video information along with the audio information in a purely random manner and with very rapid access. Video information is locked to the associated audio information so that both are always in proper synchronism.

Referring now to FIG. 4 there is shown one embodiment of the invention wherein the video information is prerecorded on the plurality of master tape loops in the same manner as the audio information, i.e., in the form of programs of selected length, wherein accordingly each video portion of a program may require a track which was used for an audio program in the FIG. 1 embodiment. Thus, in this embodiment, the same number of master tape loops will normally hold one-half as many audio/video programs as it does only audio programs. However, the audio and video information may be recorded as frequency-modulated (FM) and amplitude-modulated (AM) signals respectively, with both the FM and AM superimposed on the same track, whereby both the audio and video information is recorded in the same space used for audio alone in FIG. 1.

The portions of the system which are common to both the embodiments of FIGS. 1 and 4 are similarly numbered, and those which are partially modified in FIG. 4 are similarly numbered but include in addition a superscript.

Accordingly, the master memory bank 12, the random access audio switch 16, the individual student buffers 14, the computer/controller means 18, the control logic means 20, 22, and 24, the telephone interface 38 and the telephone company datasets 40 are essentially the same equipment as described in FIG. 1. A few of the components have minor modifications in order to allow them to handle video as well as audio information. For example, the master memory bank 12 is provided with tape loops which utilize two adjacent tracks thereon for the prerecording of both video and audio information, or one track with the video and audio superimposed thereon as AM and FM signals respectively. The individual student buffers are adapted to accept the transfer simultaneously of both the audio and video portions of the program via the random access audio switch 16. Likewise, the computer/controller means 18 is adapted to provide a program which handles all requests and status signals pertinent to the audio/video programs much in the same manner as is done in FIG. 1 with respect to the audio programs.

Note that the dedicated video apparatus, including components 34, 36, 37 and 39, has been deleted from the audio/video retrieval system of FIG. 4. It is to be understood that this apparatus likewise could be deleted from the FIG. 1 system.

Various of the other components are further modified to allow handling the video as well as audio information. Thus, the student carrels 26' include student positions, all of which include a video screen or monitor 56, as well as the keyboard 27, headset 54, and microphone 55 of FIG. 1. In addition, the keyboards of the carrels 26' and of the instructor's console 30 may be adapted to allow requesting programs with a larger request digit which might be required due to the addition of video information. The terminal unit 28' accepts commands from the keyboards 27 as does the unit 28 of FIG. 1, wherein the unit 28' of FIG. 4 may be adapted to allow the acceptance of larger digit inputs if the number of tape loops is increased to accommodate a large number of audio/video programs.

The audio/video system of FIG. 4 further includes video processing means 61 for retrieving and processing a video output from the student buffers 14. The video portion of the program is passed to respective converters of a slow scan converter means 62 wherein the program is converted to regular television line rate, as further described infra. The converted video is then passed to a video switching unit 64 and from thence to recording head means 66 of a temporary video storage means 67. The head means 66 includes at least one movable record head 68. Two movable heads 68 are shown by way of example, which heads are disposed in magnetic recording relation on a rotating magnetic disc 70 such as for example a data disc or a storage disc such as the Ampex Corporation HS-100 system. It is to be understood that various types of temporary storage means may be employed in place of the disc system shown herein, e.g., tape loop systems, storage tubes, drum systems, core memories, etc. A plurality of fixed playback heads 72 are disposed in readout relation to respective recorded tracks on the disc 70, and provide means for reading the video information from selected tracks. Each head is coupled to a respective student carrel 26', to thus supply the video information to the video screen 56. The associated audio information is introduced as shown by double solid lines, from the buffers 14, through the console 30 and thence to the headsets 54 of the respective student carrel. Thus, the video portion of the program is shown on the video monitors 56 and the audio portion is coupled to the student headsets 54. Head control is provided to the recording head means 66 as well as disc 70 via video control logic means 74, which also provides control logic to the video switching unit 64 and the scan converter means 62 to thereby synchronize while controlling the operation of these compoments. The video control means 74 is coupled to the computer/controller 18 as are the other logic means.

In operation, still pictures are recorded on the tape loops of the master memory bank 12 by means of an audio tape recorder (not shown) as slow-scan video derived from a slow-scan television camera (not shown). The master memory tapes are prepared by first recording the audio portion of the program on a first track on the tape loop, and then subsequently recording the video information via a slow-scan camera, wherein the signals derived from the camera are applied to a second track adjacent the audio track or are superimposed as AM and FM signals on the same track, in the conventional manner. The video information is thus limited to the same bandwidth as the audio. This provides the advantage of allowing random access of video information with the audio switch 16 in accordance with the invention, a feature heretofore unavailable in prior art systems. After the desired audio/video programs have been recorded on the master tape loops they are placed in the master memory bank 12 as in the system of FIG. 1, and the video as well as the audio portions of a program are transferred at the relatively high speed (e.g., 40 times the normal record speed, or at least 120 inches per second) in response to requests for the program from the student carrels 26' or the telephone datasets 40. The information transfer to the individual student buffer or buffers 14 is accomplished via the random access audio switch 16 in response to the commands generated by the computer/controller means 18 as initiated at the student carrels 26' or datasets 40. Thus, in less than 30 seconds, an entire 15-minute program of audio/video information is at the command of the requester.

The video portion of the program is still in slow-scan form, however, and must accordingly be converted to regular television line scan rate in order to be useful to the requesting student. This function is accomplished by the video processing means 61 including the scan converter means 62, which accumulates the slow-scan video information until a whole frame is formed. The slow-scan converter means 62 may be one of various available scan converters which hold a picture such as, for example, a storage-type cathode-ray tube (CRT) device, a disc storage, or a CRT-storage vidicon combination type of device.

When employing a storage-type CRT, upon transfer of a selected audio/video program by a requester the audio information is introduced to the student carrel 26'. The video information slowly appears on the CRT at synchronized intervals determined by its disposition relative to the audio information on the master tape loops, until a full frame of video is obtained. Consequently, on command from the computer/controller means 18 via the video control logic means 74, the whole frame of video is rapidly scanned by the CRT and is introduced via the video switching unit 64 to a respective recording head means 66 of the temporary storage means 67. There it is rapidly recorded on one track of the disc 70 at normal television line rate. As previously noted, the means 67 for temporarily storing the frame, or frames, of video for use by the requester, may be a disc recorder or any other type of storage means which is capable of accepting a single frame of video information and storing and displaying it indefinitely. One movable record head 68 per every 30 request positions (or students) permits unloading of up to 30 scan converters of the converter means 62 "simultaneously"; that is, in a period of from 1 to 2 seconds. A conventional form of video switching, in the form of the video switching unit 64, connects the proper scan converter to the appropriate record head 68 under control of the video control logic means 74. Multiple playback heads 72 are fixed adjacent tracks on the disc 70 wherein each head is coupled to a respective student carrel 26'. Thus, successive frames of video information which form the program, are periodically recorded in the same track by a movable record head 68 in synchronism with the audio portion of the program. The successive frames are then read out by the same fixed playback head 72, and are introduced to the video screen 56 of the student carrel. It may be seen that many requesters may be provided with continuous still-frame video in synchronism with audio, as was previously recorded in the form of programs on the master tape loops. The audio information is padded through the instructor's console 30 where it may be monitored by him if desired, and thence is fed along respective lines, to the requesting student carrel 26'.

It is to be understood that the dubber apparatus 59 described in the audio information system of FIG. 1 may also be employed in like manner in conjunction with the audio/video information system of FIG. 4.

Referring now to FIG. 5 there is shown an alternative random access audio/video information retrieval system of the invention. As may be seen, the system is similar to that of FIG. 4 wherein, however it provides alternative video processing means 61' for retrieving and processing the video information. The system of FIG. 5 depicts two different embodiments of the invention, depending upon the mode of operation chosen as further described infra. In both these embodiments, the video information is retrieved in a random access, high-speed duplication manner of operation, wherein video addresses rather than the actual video information, is placed on the master tape loops, and is transferred to the student buffers 14 along with the audio information at the high duplicating speeds. The addresses synchronize the audio information with the video information which is introduced in random access, high-speed duplicating mode via the video processing means 61'. Note that like components are similarly numbered in FIGS. 4 and 5.

Accordingly, the master memory bank 12, random access audio switch 16, student buffers 14, computer/controller means 18, control logic means 20, 22 and 24, telephone interface 38, telephone company datasets 40, terminal unit 28, student carrels 26 and the instructor's console 30 are coupled in the same manner as in the system of FIG. 4. In addition, the video control logic means 74 and the various components 66, 68, 70 and 72 which define the temporary video storage means 67' are also similarly numbered and comprise equipment similar to that of FIG. 4 with various modifications as further described hereinbelow.

The system further includes video address detector means 75 and video address logic means 76 coupled from the individual student buffers 14 to the computer/controller means 18, and optional video disc loading control means 78 coupled to the video control logic means 74. The address detector means 75 may be any of various known types of audio tone detectors which provide a direct current logic level output in response to specific audio tones. The video address logic means 76 is a serial-to-parallel converter or shift register. The disc loading control means 78 is a manual control device, which initiates the loading of the video information to the disc 70, as further described infra. A video switch matrix unit 80 is shown coupled between the recording head means 66 and 66', wherein however the head means 66 is employed as a recording or "write" head means, and the head means designated 66' employed as a reproduce or "read" head means. Likewise the associated movable heads 68 and 68' are a "write" head and a "read" head respectively. The video switch matrix unit 80 may be similar to the video switching unit 64 and provides interconnections between the incoming video signals and the write head means 66, and/or between the read and write head means 66, 66' on the same or on different discs 70.

Video information disc loading means 82 is provided either as an in-line, or an off-line, portion of the video processing system 61', as further described infra. The disc loading means 82 comprises generally, slide projector means 84 operatively coupled to television camera means 86, and (in the off-line loading system) includes the video disc loading control means 78. A video monitor 88 is coupled to the output of the camera means 86, which output is also coupled to the write head means 66 via the video switch matrix unit 80.

Since the number of tracks which can be physically recorded on the disc 70 is much greater than the number of multiple fixed heads which can be arranged along a single radius of the disc, additional banks of radially extending fixed heads may be disposed in magnetically coupled relation to other tracks on the disc, as herein indicated by numeral 72'. By way of example, the disc 70 may hold 400 to 500 concentric tracks of information, whereas one bank of fixed heads 72, 72' is formed of 25 to 30 heads. However, the movable heads 66, 66' are capable of stepping through each of the 400 to 500 tracks on the disc 70, and thus can be coupled to all the tracks on the disc.

The video retrieval concept of the FIG. 5 embodiments is based on the above-mentioned features, that the disc 70 has room for a large number of tracks each of which is accessible by the movable heads 68, 68' and that the number of fixed heads generally is of the order of only 90 to 120 heads which are connected with 90 to 120 student carrels 26 respectively. Thus, the disc has a large number of tracks which would not be used, viz, those which do not have a fixed head disposed in register therewith. By proper selection of the number of tracks on the disc and the number of fixed heads disposed therewith, there may be four to 20 or more, "unused" tracks, for every "used" track which has a fixed head in register therewith.

Thus, in the FIG. 5 systems, the video information is "permanently" or "temporarily" "stored" in these extra, "unused" tracks in the disc 70, either before the retrieval process (employing the off-line disc loading concept), or during the retrieval process (employing the in-line loading concept) respectively. That is, in the FIG. 5 embodiments the permanent storage of the video information and the time when the video information is stored on the disc 70 depends upon whether the disc loading means 82 is disposed in the in-line or off-line relation to the information retrieval system proper. By way of example only, in FIG. 5; the disc loading means 82 is said to be in-line or off-line, respectively, depending on whether the video information is "permanently stored" on the extra, "unused" tracks and is retrieved during the retrieval process initiated by the students, or whether it is "permanently stored" as slides in projector means 84 and retrieved during the retrieval process. In the off-line system, the information is generally recorded on the disc 70 from the disc loading means 82 prior to the use of the retrieval system, e.g., in the evening after the system is normally shut down.

It is to be understood that, in the off-line system, various tracks also may be up-dated during the actual retrieval process when the system is in use, wherein the write head 68 is momentarily positioned on the desired track, and a slide is viewed and the resulting signal recorded on that track during the retrieval process when students are using the retrieval system.

Further, it is to be understood that "permanently" is herein defined as referring to the relatively long term storage of the video and/or audio information which forms the various programs. "Temporarily" is defined as the short term storage of the information for a matter of seconds or fractions of seconds during the retrieval process.

In the in-line concept the slides are automatically chosen, converted to video signals, and are displayed on the student screen 56 via his respective track on disc 70, during the retrieval process, i.e., after the student selects the desired program. In the off-line system the video information commensurate with the slides is stored in the form of video signals on the tracks of the disc 70, wherein during the retrieval process the information is read via the student's tracks and fixed heads 72 or 72' and displayed on the screens 56. In either system, whether the video information is permanently stored in the form of slides in the projector means 84, or video signals on the tracks of disc 70, the video must be in synchronism with the audio information being introduced to the student carrels 26' via the buffers 14. Thus video addresses are superimposed on the tracks containing the audio program on the master tape loops of the master memory bank 12. The addresses are recorded in the form of a serial binary code by means of a digital code generator (not shown) during the recording of programs on the master tape loops. Thus if an audio/video program includes 20 slides as the video portion, each slide has an identifying digital code, which is generated by the code generator and applied to the audio track by the programmer, at its proper position along the audio portion of the program recorded on the master tape loops.

At such time as the audio/video program is selected by a student, the audio information and the video addresses are transferred at high speed to the student buffer 14; the audio is then sent to the student earphones 54 via the instructor console 30, and the video addresses are introduced to the video address detector means 75. The detector means 75 output, which represents the serial video address, is fed to the video address logic means 76. The logic means 76, which is essentially a serial-to-parallel converter, converts the incoming succession of serial binary codes to a parallel output which is introduced to the computer/controller 18. In the case of the in-line system, the computer/controller 18 selects the proper slide (identified by the video address code) in the projector means 84, selects the requesting students's fixed head (or track) on disc 70 and introduces the generated video signal via the TV camera means 86 to the track via the movable write head 68. The slides may be presented to the disc 70 one at a time, or may be presented in groups of 3, 4, etc.; the first slide of each group being placed directly on the students's track for immediate display. The other slides are quickly recorded in succession on adjacent "unused" tracks for momentary storage prior to subsequent display via the "read" head 68' video switch matrix unit 80 and "write" head 68 during the respective portion of the audio program.

In the off-line system the video addresses identify the video information which is permanently stored in the plurality of "unused" tracks on the disc 70, and the video is selected from the successive tracks in sync with the audio portion of the program, via means 75, 76, 18 and 74, which control read head 68', video switch matrix unit 80 and write head 68 to display the successive video frames on the student screen 56.

In the off-line loading concept, assuming that one 15-minute program of audio information stored in the master memory bank 12 requires 20 slides, i.e., frames, of video information, then 20 extra tracks are required on the disc 70 for each track which is coupled to a student carrel 26 via a fixed head 72. The video disc loading control means 78 of previous mention is a manual control device, which is employed in the off-line loading system to initiate the loading of the video information from the slide projector means 84 to the tracks of the disc 70. One slide is thus stored in each of the 20 tracks. This is accomplished by the supervisor, teacher, programmer, etc., by placing a succession of slides in the slide projector 84, which may be for example an Eastman-Kodak carrousel-type projector. The supervisor next selects the particular succession of (20) tracks, and directs the movable write head 68 to the first of the succession by dialing the identifying number for that track via a touch keyboard (not shown) in the loading control means 78, utilizing for example a keyboard such as keyboard 27 of FIG. 3. Thus, the write head 68 is directed to track number 201, for example, by touching keys 2, 0 and 1 of the keyboard in that sequence. Then an "unload" button (not shown) is pushed to start the disc loading process and the television camera means 86 views the slide in the projector means 84 and delivers the video signal generated thereby to the write head 68 via the video switch matrix unit 80. The unit 80 is also used if there are several temporary storage systems 67' and connection to different discs thereof is desired, (as depicted by the arrows indicated by numerals 81). The video signal corresponding to the slide is recorded on the selected track, and the sequence is continued with successive slides and tracks. The video information is thus constantly available on the disc tracks for subsequent access during the actual retrieval process, as described infra. The loading process is generally conducted when the retrieval system is shut down, but slides also may be loaded on the disc 70 during the retrieval process. To this end, the track on disc 70 is selected by the video disc loading control means 78, which also selects the desired slide in projector means 84. The "unload" button is pushed, and the write head 68 is momentarily employed to record the video signal, corresponding to the selected slide, on the track.

As previously described, the video information is generally stored in the (20) "unused" tracks on the disc 70 during the disc loading process of the off-line concept. During the retrieval process, since a particular student carrel 26 is coupled to a specific associated fixed head 72, 72', it is necessary to sequentially transfer the successive frames of video information to that particular track in order to introduce the video to the student's video screen 56. Thus, after a program request is initiated the video control logic means 74 directs the movable read head 68' to the first track of the, e.g., 20 tracks, and directs the movable write head 68 to the track corresponding to the student's fixed head 72, 72'. As the audio information transferred to the student buffer 14 is played back, the associated video information is read from its permanent storage on the tracks by the read head 68' and is fed to the write head 68 via the video switch matrix means 80, whereby the video switch is momentarily recorded on the fixed head track of the student. The video is then read by the fixed head and is introduced to the student's video screen 56. At such time as the second, third, etc., slides are desired, the video address logic means 76 so indicates, and the computer/controller 18 directs the video control logic means 74, which successively steps the movable read head 68' across the various tracks of permanently stored video in timed relation with the audio information. If the desired video is stored on one disc, and the student's fixed head is located on another disc or on the opposite recording surface of the same disc, the video switch matrix unit 80 is directed by the video control logic means 74 to close the proper switches to provide a closed path between the write head being used and the read head 66' of that particular recording surface which contains the desired video.

On the other hand, in the in-line concept of the disc loading, the extra "unused" tracks on the disc 70 are used for temporary storage of the video information (slides) immediately prior to their being shown on the video screen of the student carrel, during the actual retrieval process initiated by the student. That is, the slide projector means 84 preferably comprises a random access slide projector, such as the random access slide projectors manufactured by Sarkes Tarisan, Inc., or Eastman Kodak, wherein the video information is "permanently stored" in the form of slides. Any extra tracks on the disc 70 may be used as a temporary storage or buffer for video signals corresponding to a number of slides, e.g., four or five, during the introduction of the audio/video information to the student carrel 26'. The in-line system can be compared with a computer system wherein the disc loading means 82 is analogous to the computer tape, and the disc 70 is analogous to the core memory of the computer system.

In the in-line concept, during the video transfer process of the 15-minute program, the slides in the projector means are sequentially transferred either one at a time, or preferably in a plurality of sets, e.g., five sets of four slides. The first four slides are rapidly transmitted as video signals from the camera means 86, to a succession of four "unused" tracks on the disc, via the video switch matrix unit 80 and the movable write head 68. Control of the selection of slides, and of the tracks in which the video information is temporarily stored, is provided by the video addresses introduced to the video address detector means 75 and video address logic means 76. Means 76 provides signals to the computer/controller means 18, which directs the video control logic means 74 to select the proper slide in projector means 84 and the proper track on the disc 70, as previously described.

To reiterate, in the FIG. 5 embodiment, audio information is stored in the master tape loops of the master memory bank 12 as previously described in the systems of FIGS. 1 and 4. In addition, each track of audio information has recorded thereon video address signals in the form of additional audio signals superimposed on the audio information. The address signals thus form a video-associated portion of the audio information which is transferred at the relatively high speeds to the individual student buffers 14 via the random access audio switch 16. As may be seen, in the retrieval system of FIG. 5, the video address signals do not have to be placed on separate tracks of the master tape loops, thereby saving the number of tracks upon which video information is recorded as is done, for example, in one embodiment of FIG. 4.

Upon transfer of the audio information to the student buffers 14 as hereinbefore described, the audio information is routed to the student carrels 26 via the console 30 as in the previous systems. The video address signals are taken from the student buffer 14 and routed to the address logic means 76, and thence to the computer/controller 18. In response to the address logic, which identifies the portion of video information to be transferred to the student carrel 26 along with the audio information of the program selected, the computer/controller 18 introduces a signal to the video control logic means 74. The means 74 sends a signal to the video switch matrix unit 80 which selects the proper disc device if there are more than one, or the proper side of the disc if both surfaces are being used. Unit 80 also drives the positioning motors (not shown) of the head means 66 and 66' to place the movable write and read heads 68 and 68' on the desired tracks.

I claim:

1. A random access information retrieval system comprising the combination of:

master memory bank means for storing a variety of preselected information;

random access switch means operatively disposed to randomly access and receive information from the master memory bank means in response to commands introduced to the memory bank means and switch means;

information-receiving means operatively coupled to the switch means for receiving therefrom the information at a selected relatively high transfer speed, said information receiving means including individual record/readout means disposed to receive the information from the master memory bank means as selectively introduced via the random access switch means;

said random access switch means including matrix-type switch means having a plurality of input lines corresponding to the variety of preselected information coupled to the master memory bank means, and a lesser plurality of output lines each of which is coupled to a plurality of said individual record/readout means in time sharing relation, said matrix-type switch means providing random selection of specific portions of the stored information for selectively timed transfer thereof via the time-sharing lesser plurality of output lines and at the relatively high transfer speed to the relatively larger number of the record/readout means relative to output lines;

single information-requesting means operatively associated with said information-receiving means for initiating the commands for selection and transfer of the information and for directing the subsequent control of the information-receiving means; and controller logic means for generating said commands in response to initiation thereof by the single information requesting means and for determining the specific portions of the information to be transferred, wherein the controller logic means includes computer/controller means for generating said commands in response to initiation thereof by the single information-requesting means, and for directing transfer of the specific portions of information.

2. The system of claim 1 wherein the variety of selected information includes signals defining video and audio information, and said information-receiving means and single information-requesting means define at least one dubber means coupled to the switch means via the lesser plurality of output lines to request in time-shared random access the specific portions of the information and to record thereon the information transferred from the master memory bank means at said relatively high transfer speed.

3. The system of claim 2 wherein the dubber means includes record means including a slot for receiving and operating a cassette-type recording medium defining the information-receiving means, and keyboard means defining said single information-requesting means for initiating the commands for video and audio information transfer selectively.

4. The system of claim 3 wherein said controller logic means comprises hard-wired control logic means coupled to the keyboard means, to the master memory bank means, and to the lesser plurality of output lines of the random access switch means.

5. The system of claim 1 wherein:

said single information requesting means is adapted in association with the computer/controller means via control signals generated thereby, to assume control of the individual record/readout means upon transfer of the information.

6. The system of claim 5 further comprising console means for monitoring the information-requesting means, for initiating commands similar to those intitiated by the single information-requesting means, and for logging the specific portions of the information requested and any calls from the information-requesting means; wherein the console means includes a teletype unit adapted to log the portions of information which were requested by the information-requesting means in chronological order, as well as any calls directed to the console means from the information requesting means.

7. The system of claim 5 wherein the single information-requesting means further comprises telephone means operatively coupled to the computer/controller means for initiating the commands and for assuming control of the individual record/readout means upon transfer of the information.

8. The system of claim 5 further comprising dedicated video source means for introducing dedicated video information to the single information-requesting means in synchronism with the specific portions of information supplied thereto, wherein the computer/controller means provides synchronization of the information.

9. The system of claim 5 wherein the variety of selected information includes signals defining video information, the system further including random access video processing means comprising slow scan converter means coupled to the individual record/readout means to condition the video information transferred from the master memory bank means to the record/readout means, and temporary video storage means operatively coupled to the slow scan converter means and adapted to selectively introduce video information temporarily stored therein to the information-requesting means.

10. The system of claim 9 wherein the temporary video storage means comprises a temporary recording medium for storing a succession of frames of video information received from the slow scan converter means, movable record head means coupled to the slow scan converter means and disposed in recording relation to the temporary recording medium, and fixed reproduce head means disposed in readout relation to the temporary recording medium to introduce the succession of frames of video information to the information-requesting means.

11. The system of claim 5 wherein the variety of selected information includes signals defining video and audio information including signals representing video information addresses, the system further including random access video processing means including video address logic means coupled between the information-receiving means and the computer/controller means, video loading means for selectively introducing video information associated with the video information addresses, and temporary video storage means operatively coupled to the computer/controller means and to the video loading means and adapted to selectively introduce the video information to the information-requesting means.

12. The system of claim 11 wherein the video loading means includes slide projector means for displaying photographic slides in selected order, television camera means disposed to view the displayed slides and for generating video information corresponding thereto for introduction to the temporary storage means, and loading control means for determining when the slides are displayed and thus when the video information is introduced to the temporary storage means.

13. The system of claim 11 wherein the temporary storage means comprises a temporary recording medium for storing a succession of frames of the video information received from the video loading means, movable write head means and read head means coupled to the temporary storage loading means and disposed in recording and readout relation respectively to the temporary recording medium, and fixed reproduce head means disposed in readout relation to the temporary recording medium to selectively introduce the succession of frames of video information to the information requesting means.

14. The system of claim 5 wherein the master memory bank includes at least one master recording medium having a plurality of tracks for storing the variety of preselected information, a plurality of magnetic heads disposed along respective tracks, and a plurality of electronic circuits coupled to the heads to provide means for readout of the specific portions of the information from at least one track, said electronic circuits including the plurality of input lines for introducing the information to said switch means, wherein the information is selectively introduced with random access to respective recording mediums of said individual record/readout means via the lesser plurality of output lines.

15. The system of claim 14 wherein the switch means includes a full matrix audio switching unit adapted to interconnect a master recording medium and at least one of the plurality of individual recording mediums via the lesser plurality of output lines in response to the commands generated by the computer/controller means.

16. The system of claim 14 wherein the switch means includes a trunkline switching unit adapted to interconnect a master recording medium with a selected number of the plurality of individual recording mediums via the lesser plurality of output lines in response to the commands generated by the computer/controller means.

17. The system of claim 14 wherein the single information-requesting means includes a plurality of request stations operatively coupled to respective individual recording mediums, each Station including headset means and microphone means to allow monitoring the information transferred to the individual recording mediums, for responding thereto, and for monitoring the responses; and touch keyboard means of selected number of keys for initiating the commands generated by the computer/controller means.

18. The system of claim 17 wherein the touch keyboard means includes nonmoving keys and solid-state circuitry for generating request signals when a selected key is touched; and the computer/controller means first generates commands indicative of identifying numerals of the specific portions of the information to initiate transfer of the information to the individual recording mediums associated with the keyboard means, and secondly upon transfer of the information generates commands in response to the signals from the keyboard, which commands control of the operation of the individual recording medium.

19. The system of claim 17 wherein the computer/controller means includes respective interface control logic means coupled to the master memory bank means, to the switch means and to the individual record/readout means to provide logic to control and synchronize the various components; and further includes a terminal unit coupled to the plurality of request stations to receive the request signals and command signals from the plurality of touch keyboard means.